United States Patent

Lindberg, Jr.

[15] 3,682,100

[45] Aug. 8, 1972

[54] NOSE-CONE COOLING OF SPACE VEHICLES

[72] Inventor: John E. Lindberg, Jr., Lafayette, Calif.

[73] Assignee: Sheriff of Alameda County, Calif. ; as Custodia Legis for the Superior Court

[22] Filed: Aug. 11, 1964

[21] Appl. No.: 390,259

Related U.S. Application Data

[60] Division of Ser. No. 186,600, April 5, 1962, Pat. No. 3,255,698, Continuation-in-part of Ser. No. 725,110, March 31, 1958, abandoned.

[52] U.S. Cl.................................102/105, 244/1 SS
[51] Int. Cl.............................................F42b 15/12

[58] Field of Search........102/92.5, 49, 56; 244/1 SS, 244/117.1; 62/4, 239, 239 A

[56] References Cited

UNITED STATES PATENTS 3,026,806   3/1962   Runton et al.............102/92.5

*Primary Examiner*—Samuel W. Engle
*Attorney*—A. Donham Owen

[57] ABSTRACT

This invention relates to the nose-cone cooling of space vehicles including missiles and more particularly to missiles whose nose structures incorporate means for dissipating heat therefrom.

8 Claims, 12 Drawing Figures

PATENTED AUG 8 1972
3,682,100
SHEET 1 OF 3
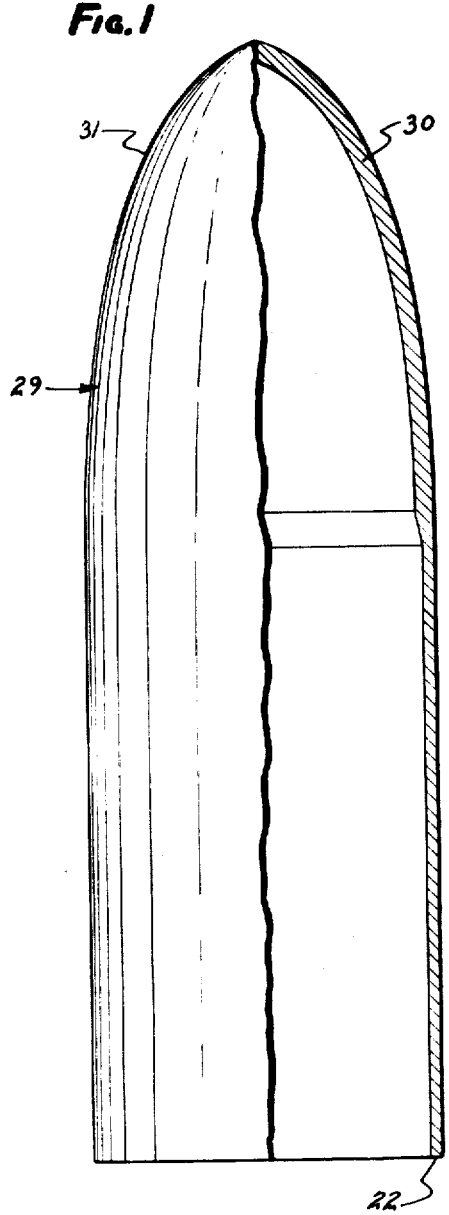
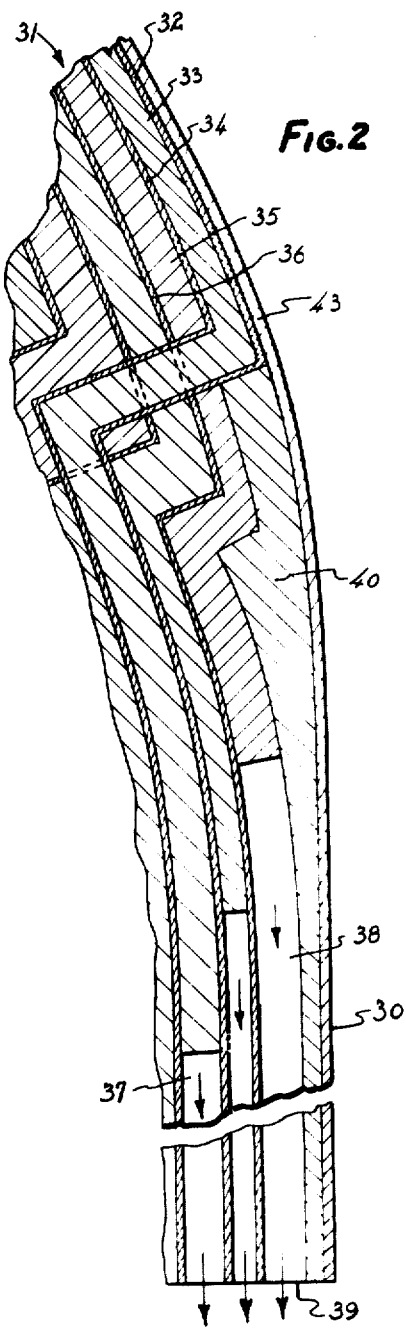
INVENTOR.
JOHN E. LINDBERG
BY
ATTORNEY

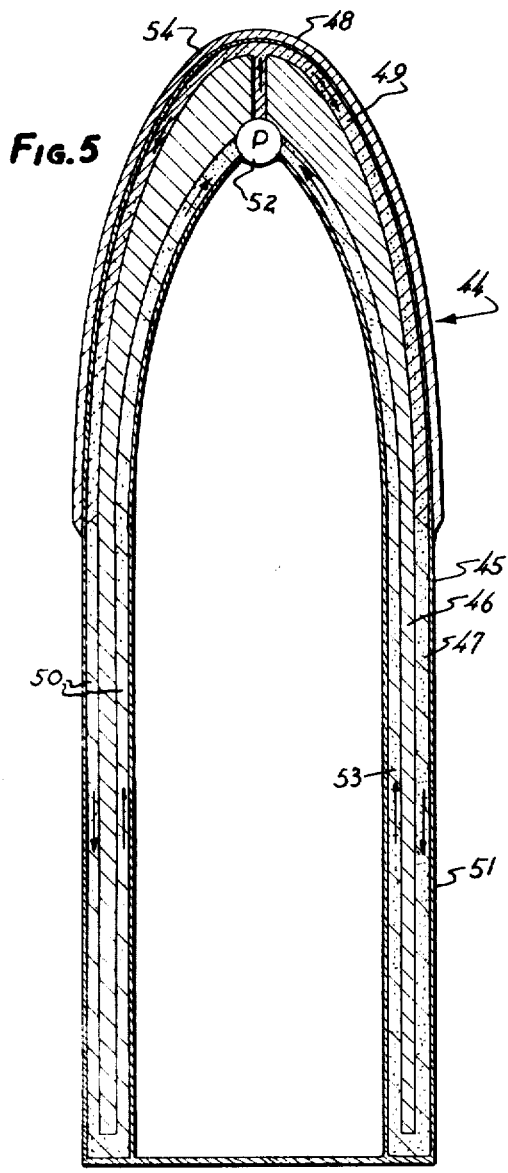
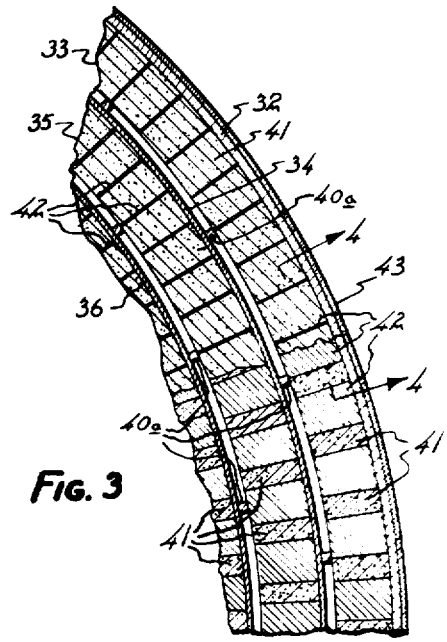
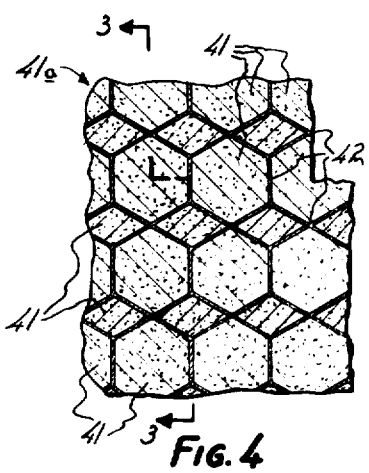
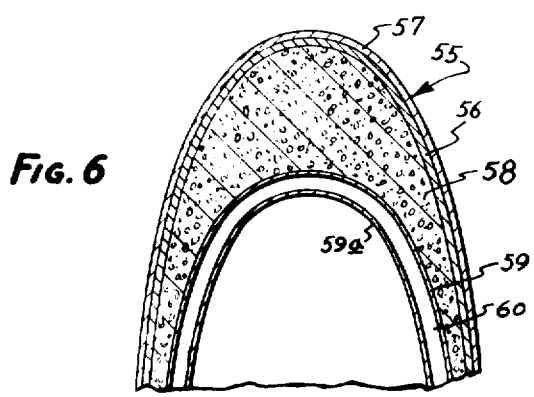
INVENTOR.
JOHN E. LINDBERG

PATENTED AUG 8 1972  3,682,100

INVENTOR.
JOHN E. LINDBERG
BY
ATTORNEY

NOSE-CONE COOLING OF SPACE VEHICLES

This application is a division of application Ser. No. 186,600, filed Apr. 5, 1962, now U.S. Pat. No. 3,255,698, which was a continuation-in-part of application Ser. No. 725,110, filed Mar. 31, 1958, now abandoned.

It is well known that an object entering the earth's atmosphere at even moderate speed is heated considerably by the attendant aerodynamic conditions at the surface of the object. Such heating occurs when vehicles re-enter the atmosphere and is a serious problem, forcing drastic limitations on the maximum re-entry speed which a structure of given design can attain without being severely damaged or even destroyed. This heat is primarily developed and is largely concentrated at the nose.

An important object of the present invention is to efficiently dissipate the heat developed at the nose. By achieving this object, the invention makes it possible to use higher re-entry speeds and therefore gives greater freedom in missile design and increases the missile's ability to avoid interception.

Other objects and advantages of the invention will appear from the following detailed description of some preferred embodiments thereof.

In the drawings:

FIG. 1 is a view in elevation and half in section of the shell of the forward portion of a missile.

FIG. 2 is a greatly enlarged fragmentary view in elevation and in section of a portion of the shell of FIG. 1 showing incorporation therein of one form of the present invention.

FIG. 3 is a further enlarged fragmentary view of a portion of FIG. 2 showing one type of lamination structure suitable for use in the shell of FIG. 2.

FIG. 4 is a fragmentary view in section taken along the line 4—4 in FIG. 3.

FIG. 5 is a view in elevation and in section of pertinent portions of another missile, showing a different shell structure embodying a modified form of the invention.

FIG. 6 is a fragmentary view in elevation and in section of the forward end of a missile generally like that of FIG. 5 but embodying another modified form of the invention.

Figure 7:
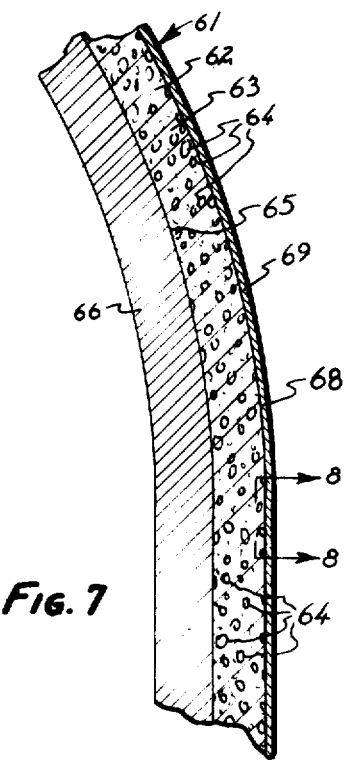
FIG. 7 is a view in elevation and in section of a portion of a missile nose incorporating therein another form of the invention.

In order to illustrate the invention more clearly, the figures have been made somewhat diagrammatic in form and do not show the contents within the shell since the undesirable heat is developed at the shell and must be dissipated therefrom. The invention is independent of the contents of the vehicle itself.

As an illustrative example of a space vehicle to which this invention applies, a missile 29 is shown in FIG. 1, which indicates the general form of its shell 30. Referring next to FIG. 2, it will be noted that the nose portion 31 of the shell 30 may be laminated to provide layers 32, 34, and 36, for example, of a suitable heat-conducting metal with alternate layers of heat-dissociable material 33 and 35 sandwiched therebetween. The metal layers 32, 34, and 36 are preferably between 0.005 and 0.050 in. thick, while the layers 33 and 35 may be between about 0.05 and 1.0 in. thick. Although only five layers 32, 33, 34, 35, and 36 are shown in the drawings, by way of example, the laminated shell 30 in the nose region 31 typically has dozens of such laminations.

The heat-dissociable material may be comprised of hydrides of the so-called getter metals. These hydrides, as explained in my co-pending application Ser. No. 695,357, filed Nov. 8, 1957, are valuable heat-transfer agents, because the metallic hydride is dissociated into metal and hydrogen in an endothermic reaction, absorbing a large amount of heat per unit weight and per unit volume, as illustrated in tables I and II below.

TABLE I

THERMODYNAMIC PROPERTIES OF TYPICAL ALKALINE AND ALKALINE EARTH HYDRIDES

| Hydride | Heat of Dissociation in Gram-Calories per Gram of compound | Heat of Dissociation in Gram-Calories per cubic Centimeter of compound | Latent Heat of Fusion of the metal in Calories per cubic centimeter | Latent Heat of Vaporization of the metal in Calories per cubic centimeter | Specific Heat of the metal in Calories per cubic centimeter per °C near 20°C |
|---|---|---|---|---|---|
| LiH | 2720 | 2230 | 53 | 2590 | 0.418 |
| NaH | 571 | 788 | 26 | 9850 | 0.29 |
| KH | 339 | 492 | 13 | 426 | 0.15 |
| CaH$_2$ | 1070 | 2030 | 80 | 1490 | 0.23 |
| SrH$_2$ | 426 | 1382 | 67 | 1070 | 0.46 |
| BaH$_2$ | 294 | 1238 | 47 | 1080 | 0.08 |

TABLE II

THERMODYNAMIC PROPERTIES OF TYPICAL GROUP B HYDRIDES

| Hydride | Heat of Dissociation in Gram-Calories per Gram of compound | Heat of Dissociation in Gram-Calories per cubic Centimeter of compound | Latent Heat of Fusion of the metal in Calories per cubic centimeter | Latent Heat of Vaporization of the metal in Calories per cubic centimeter | Specific Heat of the metal in Calories per cubic centimeter per °C near 20°C |
|---|---|---|---|---|---|
| TiH$_{1.75}$ | 634 | 2480 | 471 | 10,050 | 0.62 |
| ZrH$_{1.92}$ | 418 | 2275 | 392 | 10,150 | 0.45 |
| PdH$_{0.56}$ | 237 | 255 | 456 | 12,400 | 0.70 |

Certain metals such as copper, tungsten, iron, and nickel which form hydrides of the class known as group A (others are listed in my referred-to Patent application Ser. No. 695,357) are suitable for use when combined with group B hydrides. The formation of a group A hydride is endothermic, and, since the dissociation of a group B hydride is also endothermic, the combination of a type A metal with a group B hydride will absorb heat as the temperature of the surrounding medium is elevated. Some properties of type A hydrides are listed in table III.

TABLE III

THERMODYNAMIC PROPERTIES OF TYPICAL HYDRIDES OF GROUP A MATERIALS

| Hydride | Heat of formation in Gram-Calories per Gram of Compound | Heat of Formation in Gram-Calories per cubic Centimeter of compound | Latent Heat of Fusion of the Metal in Calories per cubic Centimeter | Latent Heat of Vaporization of the Calories per cubic Centimeter | Specific Heat of the metal in Calories per Cubic centimeter Per °C Near 20°C |
|---|---|---|---|---|---|
| NiH$_2$ | 97.2 | 684 | 641 | 12,500 | 0.93 |
| CuH | 79.3 | 506 | 438 | 11,200 | 0.81 |

Suitable hydrides include the stoichiometric hydrides of the alkali and alkaline earth metals and the non-stoichiometric getter hydrides, some of which are listed above in tables I and II. The stoichiometric metallic hydrides are those of lithium, sodium, potassium, rubidium, cesium, francium, calcium, strontium, barium, and radium, all of which are suitable for this invention, except that some of them are currently expensive. Beryllium and magnesium form stoichiometric hydrides that decompose at low temperature (beryllium hydride at about 125°C. and magnesium hydride at about 280° to 300°C.) Suitable non-stoichiometric hydrides, members of group B, are those of scandium, titanium, vanadium, ytterbium, zirconium, niobium, hafnium, tantalum, the rare-earth metals (atomic numbers 57–71), and the actinides (atomic number 89–103), though many of these are currently expensive and difficult to obtain in quantity.

Also useful are the borohydrides —compounds of metals with the borohydride radical, BH$_4$. Examples are the borohydrides of aluminum, beryllium (decomposes at 123°C.), lithium (decomposes at 275°C.), sodium, zirconium, etc. Of course, for most applications, some of these are much more useful than others while still others are impractical in some situations. The selection can be made to accommodate the desired operating conditions.

Alloys of hydrides are also useful, including alloys of alkaline or alkaline earth hydrides alone, alloys of the non-stoichiometric hydrides, alloys comprised of members of each group, and alloys of or with borohydrides therewith. Hereafter the generic term type "B" hydride shall be used to designate the alkaline earth and alkaline hydrides as well as the group B non-stoichiometric getter hydrides.

In addition to the endothermic processes described previously as means of heat transfer, utilization may be made of the latent heats of fusion and vaporization of the metals involved in the hydride and of a carrier for the hydride, such as ceramic or graphite. Fusion and vaporization are, of course, endothermic processes; fusion requiring on the order of a few hundred calories per cc of metal and vaporization requiring about 5 to 15 K Cal per cc of metal. Similarly the heats of dissociation and of ionization for the liberated hydrogen may also, under favorable conditions, be used for the heat transfer process. The magnitude of heat of dissociation of hydrogen is on the order of 100 K Cal/mole H$_2$ and that for the ionization is on the order of 300 K Cal/mole hydrogen ions. In addition, when metallic vapor is present, it may also be possible to utilize its heat of dissociation and of ionization as valuable heat transfer mechanisms. Most gases are fully dissociated above 8,000°K and are ionized above 16,000°K at one atmosphere of pressure. Whether the aforementioned properties are useful in a particular application, depends upon the actual temperature of the nose cone in that application. This temperature, in turn, depends upon the velocity of the vehicle and the medium in which it is moving. These conditions determine to some extent the optimum choice of heat transfer material and of engineering design. The examples to be described will illustrate this. The gas temperature near the surface of the nose cone may be found from the following approximate formula $$T - T_o = (v/100)^2$$

where:
$v$ = vehicle velocity in miles per hour.
$T_o$ = initial temperature of the atmosphere in °C.
$T$ = temperature of the gas near the surface of the nose cone in °C.

As an example of the use of the formula let:
$T_o = 0°C$
$v = 10,000$ miles per hour then $$T = [10,000^2/100] = 10,000°C$$

In the event it is decided that advantage may be taken of the heats of dissociation and of ionization of the liberated gas, it may be desirable to employ "deuterides" instead of hydrides since the heats of dissociation and of ionization for deuterium are larger than those of hydrogen. For example, palladium deuteride, whose general properties correspond to those of palladium hydride, may be used.

The first examples of my invention to be discussed are particularly applicable when the aerodynamic conditions at the nose cone produce temperatures below that required for appreciable ionization of a gas. These conditions will be experienced when a relatively small magnitude of heat is generated over a relatively long period of time. Under these conditions oxidation of any or all oxidizable unprotected surfaces or fluids released may take place, and oxidation is an undesirable exothermic reaction.

In the embodiment of FIGS. 1 and 2, each layer 33, 35 (and so on) of heat-dissociable material is connected to a duct 37, 38 (and so on) which in turn extends to and exhausts at the aft end 39 of the missile shell 30. The metal layers 32, 34, 36 (and so on) may be special alloy steels or any highly heat-resistant metal which is also a good heat conductor and may be coated or processed to prevent or retard oxidation. For example, the layers 32, 34, 36 may be siliconized molybdenum, i.e., molybdenum which has been processed to convert the skin to molybdenum disilicide to protect it from oxidation.

As heat is generated at the first metal lamination 32, the first layer of heat-dissociable material 33 receives most of the transferred heat. The result, particularly when a type "B" hydride is used, is an endothermic reaction wherein hydrogen is outgassed, removing a large quantity of heat as heat of dissociation (see table II), and the hydrogen is then passed through the duct 37 and carried aft to the exhaust point 39, carrying with it some of the developed heat contained in the hydrogen by virtue of its relatively high specific heat. At the exhaust point 39, the hydrogen may oxidize and be used as desired or expelled. As the layer 33 becomes fully outgassed and can no longer transfer heat away from the metal 32 by outgassing hydrogen in an endothermic reaction, the first thin layer 32 of metal will melt away. The metal layer 32 may possibly oxidize but not before heat transfer has been carried out by the endotherm of the heat dissociable reaction. This melting is also endothermic and will cool the nose 31 somewhat, exposing the first layer 33 of the heat-dissociable material. This layer 33, having outgassed, is now substantially metal, and it too is carried away, as by melting, in another endothermic reaction that tends to cool the nose 31. Table IV shows the melting points of typical metals.

TABLE IV

MELTING AND BOILING POINTS OF THE METALS OF TABLES I, II AND III

| Compound | Melting Point at 1 atm of the Metal, °C | Boiling Point at 1 atm of the Metal, °C |
|---|---|---|
| LiH | 180 | 1,370 |
| NaH | 98 | 892 |
| KH | 63.4 | 770 |
| $CaH_2$ | 850 | 1,440 |
| $SrH_2$ | 770 | 1,380 |
| $BaH_2$ | 704 | 1,640 |
| $TiH_{1.75}$ | 1,812 | 3,535 |
| $ZrH_{1.92}$ | 1,852 | 5,000 |
| $PdH_{0.56}$ | 1,552 | 4,000 |
| NiH | 1,453 | 2,730 |
| CuH | 1,083 | 2,600 |

The heat is now transferred chiefly by the next metal lamination 34 to the next layer of heat-dissociable material 35, which outgasses through its duct 38 to the end 39 of the missile. Since, as stated before, there may typically be dozens of such layers, the process of heat transfer via the heat of transformation of the heat-dissociable material, the transportation of hydrogen, the melting of the metal layer, and the melting and dissipation of the outgassed metal, continues from layer to layer always aiding in the cooling of the nose of the missile except for possible oxidation, which in any case, because of structural design, will be limited in its capacity to oppose the desired heat transfer characteristics. The number, thickness, and composition of the metal layers and the heat-dissociable material layers may be adjusted by design to insure that all aerodynamic heating developed by the re-entry of the missile into the atmosphere will be dissipated before all these protective laminations have been destroyed. The heat dissociable materials are so chosen that the dissociation endotherm is approximately completed before temperatures are attained at which fusion of the metals involved takes place.

At some given portion 40 (see FIG. 2) the layers are adjusted in thickness so that the nose 31 of the missile will always be a smooth contour of proper shape as each layer is destroyed. Also, the ducts 37, 38, etc. are so arranged that they are cleared of hydrogen upon the dissolution of the getter layers to which they are connected. The inner layers of the getter material preferably terminate at progressively greater distances down the side of the nose cone, ensuring that the outgassed material will not burn too near to a duct that is then carrying hydrogen from a lower outgassing layer. This is shown in the stepped construction of FIG. 2.

The laminations may be constructed as shown in FIGS. 3 and 4. Each layer 33, 35, etc. of heat-dissociable material may be constructed by packing hydride 41 into cells 42 of sheets 41a of metal which have a honeycomb form, such as "Hexcell" honeycombed metal. Other cells 41 are empty to give gas passages. The metal forming the honeycomb sheet 41a may be the same as the metal in the layers 32, 34, and 36 or may be another metal, but in either case the metal should be one which has a melting point above the temperature required for completion of the dissociation endotherm of the heat-dissociable material. One side of each honeycomb sheet 41a may then be intimately bonded to its outer layer 32, 34, etc., while the unbonded side gives a gas passage 37, 38 between laminations. Structural members 40a which may be constructed of metal or ceramic are provided to maintain the fabricated layers 33, 35, etc. rigidly in place. They are small and do not obstruct gas flow through the passages 37, 38. The laminations thus formed possess an advantage in that there is more rapid transfer of heat through the metal 41a to the getter material 41, and this rapid heat transfer increases the efficiency of the nose cooling operation.

If desired, a relatively thick coating of ceramic or vitreous material 43 may be applied over each layer of metal or over at least the outer layer 32 to delay heating and thereby delay destruction of a given layer of the lamination. Such a coating 43 is preferably applied to the side of the layer receiving the heat, and is illustrated in FIG. 2 where a ceramic coat 43 is shown over the outer metal layer 32. There may be coatings over the layers 34 and 36 also, although these are not illustrated in this view.

A modified form of my invention employing endothermically heat-dissociable material for nose cooling of missiles is illustrated in FIG. 5. This structure is also useful for relatively small heat generation over a relatively long period of time. Here, a missile 44 has a thin metal shell 45 which is separated from the inner body 46 by a duct 47. Typically, the shell 45 may be constructed of siliconized molybdenum or steel, as before. Toward the missile's nose 48 the duct 47 may be filled with suitable heat-dissociable material 49 having a low melting point, such as lithium hydride, for example, which has been fully ingassed. The remainder of the duct 47 may then be filled initially with metal 50 native to the hydride 49. For example, if lithium hydride is used, the metal will be lithium.

Heat generated at the nose cone 48 of the missile is transferred through the metal shell 45, heating the hydride 49 adjacent thereto. If lithium hydride is used, this hydride will become liquefied, because of its low melting point, and dissociated, each of these processes being endothermic. Similarly the remaining lithium metal 50 in the duct 47 will become liquefied. A pump 52 will pump the liquefied material in the duct 47 along pipes 53 to the nose 48 of the missile 44. This forces the dissociated lithium and hydrogen to a region 51 lying to the rear of the nose cone 48, where they recombine exothermically and release heat along the sides of the missile 44, where it is dissipated by radiation. The liquid hydride thus formed is circulated by the pump 52 through the pipes 53 to the nose 48 of the missile for reuse. In this application it is necessary to choose hydrides which have low melting points or which will be in the liquefied state at temperatures below those for which heat generation at the nose cone becomes a serious problem. This is so in order that the material may be continuously pumped by the pump 52.

In applying this method of nose cooling, some of the heat transferred from the nose 48 via the endothermic dissociation of the lithium hydride may be utilized to generate power to drive the pump 52, instead of dissipating this heat entirely. Thus, useful work may be gained from the transferred heat.

This method of nose-cone cooling possesses the advantage that the heat-transfer medium is not destroyed or exhausted from the missile but is reused in a cyclic process. Also, the heat generated at the nose 48 may be transferred by the heat transfer medium described to any location desired, for use in doing work or for dissipation, depending upon the intention of the designer of the missile. For example, the liquid metal and the hydrogen may be carried from the nose by separate ducts and allowed to recombine and liberate heat only over a relatively small area such as at the tail of the missile where the heat may be used beneficially. The recombination being an exothermic reaction, most of the heat will be carried as stored chemical energy and dissipated in the recombination reaction.

The nose shown in FIG. 5 may also be provided with an external ceramic or vitreous coating 54. This coating 54 serves to protect the metal shell 45 from oxidation in the region of greatest heating and also serves to delay heating of the missile.

FIG. 6 shows a nose section 55 of another modified form of the invention especially applicable when the temperatures encountered are below that required for ionization of a gas. Its outer skin 56 is preferably dense and non-porous and may be coated with a very smooth ceramic or vitreous glaze 57. An inner cooling mass 58 preferably comprises particles of getter metal and of the ceramic bonded together. Such a mass 58 may be made by combining powered heat-dissociable material, such as a metallic hydride, with powdered ceramic material to form a porous structure. The metal native to the hydride in this instance is one which has a vaporization temperature below that required for fusion of the ceramic. The pressed mix may be fired to make a strong and very refractory material by choosing an ingassed getter that does not decompose at the firing temperature, or by ingassing the metal after firing, the getter material being converted to hydride by the ingassing process. The mass 58 is so arranged that all the getter material is connected, by other getter material or by free gas passages, to a porous inner nose-cone wall 59 and thus to an adjacent gas passage 60 between the wall 59 and a non-porous wall 59a. The passage 60 leads to an afterpart of the missile, where possible ignition of the hydrogen can do no damage and where beneficial use thereof may be made, if desired.

In operation, the nose section 55 is aerodynamically heated during re-entry into the earth's atmosphere but the heat generation is kept to a minimum by the smooth surface. Heat transmission is kept to a minimum by the low heat conductivity of the ceramic material in the mass 58. The ceramic is very refractory but even so is able to withstand a very high temperature only temporarily. However, as the nose section heats, some of the heat flows inwardly and outgasses hydrogen from the portions of the hydride mass 58 lying closest to the skin 56, cooling the ceramic-like body by the endotherm of the dissociation and also by conveying away the outgassed and heated hydrogen, which carries away heat by virtue of its high specific heat. The outgassed hydrogen flows through the passage 60 to the exhaust at or near the after part of the rocket. When the dissociation endotherm of the material in this first, outermost portion of the mass 58, is completed, the temperature of the next incremental layer of hydride in the mass 58 is raised until the getter dissociates, and the outgassed $H_2$ flows through passage 60 as before. The temperature of the remaining hydride is raised incrementally until eventually all of the hydride in mass 58 is outgassed, the hydrogen flowing out through the duct 60. When the hydride in the mass 58 is completely outgassed, further heating raises the temperature of the outgassed metal that remains when the hydrogen has gone, and this increase in temperature eventually causes this metal to first melt and later to vaporize, both melting and vaporization of the metal also being endothermic processes. This additional cooling is only possible because the ceramic body holds the metal during the time that melting and vaporization of the metal takes place. This method provides substantial local cooling almost instantly as needed, and greatly increases the maximum temperature and the length of time at that temperature to which the missile nose can be subjected, making it possible to employ a higher re-entry velocity with the missile.

As the outer portion of the nose 55 finally exceeds the temperature limit of the ceramic, due to the consumption of the getter material and the other factors, the outer ceramic surface 57 is dissipated while absorbing its heat of vaporization, a further aid to cooling, and the high temperature penetrates further, causing further internal cooling by dissociation of the highly refractory material of the mass 58, thus further extending the life of the nose cone.

Among the carrier materials with which to combine the heat dissociable material in the mass 58 are the allotropic forms of carbon such as graphite. A mixture of powered graphite and powdered heat dissociable material may be fired to form a porous structure which is subsequently ingassed. At ordinary pressures graphite sublimes upon reaching a temperature of approximately 3,500°C., this process requiring about 140 K Cal/mole. The occurrence of the sublimation of graphite in lieu of melting possesses a distinct advantage in that the graphite carrier will retain its constituted porous form until all of the endothermic processes of all suitably chosen materials, including that of the carrier, take place, thus tending toward a maximum heat transfer efficiency.

Figure 8:
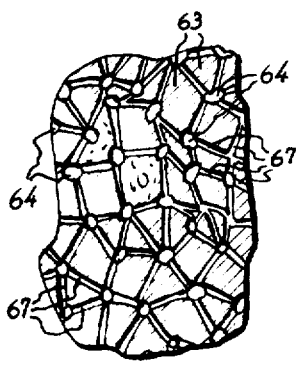
FIG. 8 is an enlarged fragmentary view in section taken along the line 8—8 in FIG. 7.

FIGS. 7 and 8 show a segment of a nose cone 61 utilizing a combination of both endothermically and exothermically heat dissociable materials in nose cone cooling. This form of my invention is preferred when aerodynamic conditions at the nose cone 61 result in temperatures near those producing substantial ionization of a gas. Under these conditions, oxidation rates are very slow and thus oxidation does not become an important factor. Typically an outermost layer 62 of the nose cone 61 comprises ceramic, graphite, or other high refractory material 63 in which is embedded a large number of interconnected and closely spaced pores 64, which may be on the order of a few thousandths of an inch in diameter. A certain fraction of the pores contain type "A" metal while the remaining pores contain either type "B" hydride or type "B" deuteride. The constituted cermet (ceramic-metal combination) is porous throughout except at its inner surface 65 where it is securely bonded to a substructure 66 of the nose cone 61. The interconnection of the cells or pores 64 by passages 67 and the porosity of the cermet 63 assure that gas may pass freely among the cells 64 and up to the outer surface 68.

The whole outer surface 68 is then coated with a suitable plastic or vitreous material 69, which protects the heat dissociable material contained in the cermet 63 from exposure to the elements prior to the time when heat generation at the surface of the nose cone should be dissipated. The cermet layer may be from a fraction of an inch to many inches in thickness. Heat dissociable materials are chosen whose native metals have vaporization points below the melting (or sublimation) temperature of the refractory material so as to utilize their heats of fusion and of vaporization.

Heat generated at the surface 68 of the nose cone causes the endothermic dissociation of the type "B" hydride or deuteride. The liberated gas thus flows to adjacent pores 64, some of which contain type "A" metal, to form type "A" hydride or deuteride, an endothermic reaction. As the temperature of the nose cone 61 continues to rise, melting and subsequent evaporation of the metals occur, and the metallic vapors rise to the surface 68 of the nose cone along with the liberated gas. There, subject to the extreme heat generated at the surface 68, they endothermically dissociate and ionize. This process, which takes place at the surface 68 of the nose cone 61, does not necessarily carry heat away from the nose cone body; however, it functions as a heat barrier which in effect dissipates part of the energy of the shock wave which is immediately adjacent to the surface 68 of the nose cone and so results in lower temperatures there. All of these transformations take place endothermically and result in overall heat transfer to cool the nose cone. Ionization of most gases will occur near temperatures of 16,000° Kelvin, which are easily generated at the nose cone of a fast moving vehicle, due to aerodynamic heating during reentry. At these elevated temperatures oxidation is not a significant factor and thus over a short period of time a large amount of heat may be dissipated.

The nose cone 61 need not, for all uses, comprise pores of both group A metal and group B hydride. The pores 64 may be embedded either with type "B" hydride or deuteride alone or simply with a metal itself. When a type "B" hydride is used alone, the heat transfer process is as follows: Heat generated at the nose cone 61 is applied to the hydride contained in the cells 64 resulting in an endothermic dissociation of the hydride. The liberated gas comes to the surface 68 where, accompanied by the endothermic vaporization of the surface of the refractory material, it is endothermically dissociated and ionized, while the remaining metal is endothermically melted and vaporized, the metallic vapor subsequently being dissociated and ionized at the surface. When a metal alone is inserted in the pores 64, heat generated at the nose cone surface is transferred to the metal resulting in the endothermic melting and vaporization of the metal with subsequent dissociation and ionization of the metallic vapor at the surface.

Figure 9:
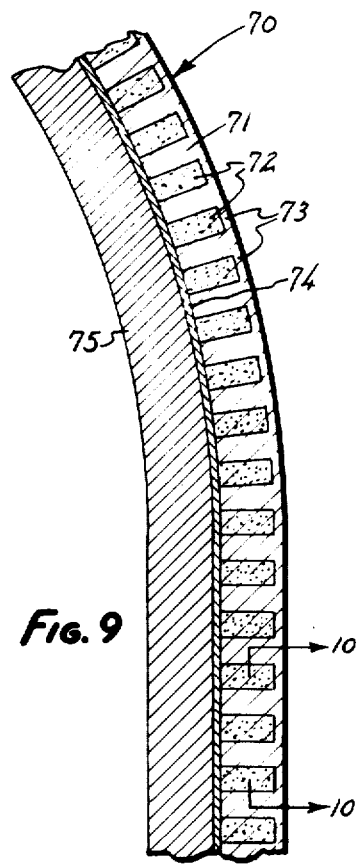
FIG. 9 is a view similar to FIG. 7 showing a modified form of shell structure of the present invention.
Figure 11:
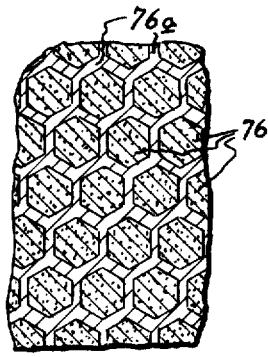
FIG. 11 is a view similar to FIG. 10 of another modified form of structure like that in FIG. 9.
Figure 10:
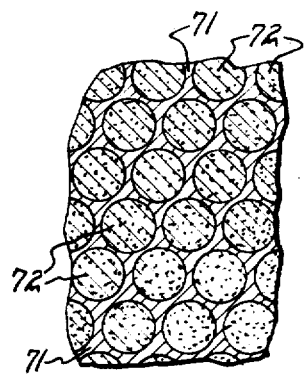
FIG. 10 is an enlarged view in section taken along the line 10—10 in FIG. 9.

FIGS. 9 and 10 illustrate a modified form of my inven-tion applicable to extreme heat conditions at the nose cone over short periods of time. In this case, a nose cone 70 has an outer layer 71 of ceramic, graphite, or other high refractory material with numerous and closely spaced cells 72 extending from just below a thin non-porous skin 73 of the refractory layer 71 to an inner layer 74 where it is securely bonded to the substructure 75 of the nose cone 70. The cells 72 may contain either type "B" hydride or deuteride or a combination of type "A" metal and type "B" hydride, or they may contain simply a metal itself. Heating of the nose cone results in an endothermic reaction within the cells 72, while further heating eventually breaks down the non-porous layer 73 of the refractory material. This breakdown requires the absorption of its heat of vaporization and allows the gas to escape to the surface, where it is endothermically dissociated and ionized. At the same time the remaining metal is being endothermically melted and vaporized, the metallic vapor being subsequently dissociated and ionized. In the case that the cells 72 are filled with metal alone, melting and vaporization and subsequent dissociation and ionization of the metallic vapor can take place. The process of dissociation and ionization at the surface does not necessarily carry heat away from the nose cone body but does function as an effective heat barrier as explained above in connection with FIGS. 7 and 8. The vaporization temperature of any of the metals involved should of course be below that of the refractory melting point. Again, the resulting process is an overall heat transfer tending to cool the nose cone. A cross section of the layer 71 with its cells 72 is shown in FIG. 10, while an alternative structure is shown in FIG. 11, where cells 76 of heat dissociable material are provided in a "Hexcell" type of sheet 76a.

Figure 12:
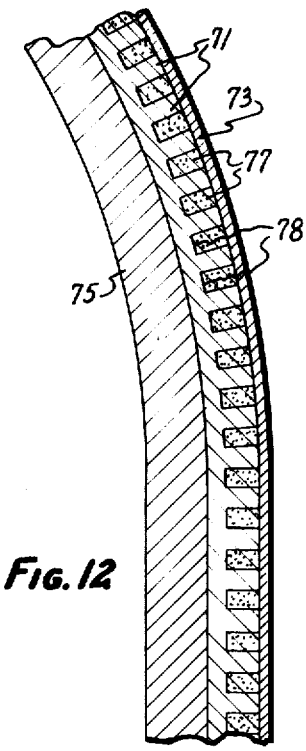
FIG. 12 is a view similar to FIG. 9 showing still another modified form of shell structure.

FIG. 12 illustrates another modified form of my invention applicable to extreme heat conditions at the nose cone over short periods of time. The geometry of FIG. 12 is generally similar to that of FIG. 9 except that in FIG. 12 cells 77 (corresponding to the cells 72 of FIG. 9) are not extended to form a bond with the substructure 75. Instead, a portion of the refractory material 71 itself is used as a base 78 for the cellular structure, while the outer layer 73 consists of a thin vitreous, plastic, or other material which serves to seal the cells 77 prior to the time heat is generated at the nose cone. The actual heat transfer operation is similar to that described for FIG. 9, and the "fills" for the cells 77 may be any of the materials or combinations previously described in connection with the cells 72 in FIG. 9.

The examples heretofore described have employed hydrides (including deuterides) as heat dissociable material; however this invention is not solely restricted to the use of these materials. For example, in FIG. 9 the fills for the cells 72 may consist of fully ingassed silver oxide ($Ag_2O$). Heat generated at the surface of the nose cone 70 causes the endothermic dissociation of the silver oxide which requires 7,250 calories per mole of compound. In this case, it is desirable to construct the outer layer 73 of a material which is already oxidized, such as ceramic, so that the evolved oxygen resulting from the dissociation of the silver oxide will not oxidize the carrier material but instead will rise to the surface, where it may be endothermically dissociated and ionized if temperatures at the surface are high enough. Further cooling is provided by the endothermic melting and vaporization of the silver residue contained in the cells 72 and again if the temperature at the surface is high enough, the subsequent dissociation and ionization of the metallic vapors may take place. Finally the destruction of outer layer 73 of the carrier ceramic will take place but this is also an endothermic process which requires a large amount of heat. Thus the whole process is one which tends to prolong the life of the nose cone.

Examples of the relative magnitude of a few of the endothermic reactions previously described are tabulated in table V.

TABLE V

| Column | 1<br>Heat absorbed in calories per cubic centimeters of compound in reaction only | 2<br>Heat of Column 1 plus heat from melting and vaporizing the metals | 3<br>Heat of Column 2 plus heat of dissociation and ionization of the gas | 4<br>Heat of Column 3 plus heat of dissociation and ionization of the metallic vapor |
|---|---|---|---|---|
| Reaction | | | | |
| $2LiH \rightarrow 2Li + H_2$ | 2,230 | 6,330 | 42,930 | 55,730 |
| $TiH_2 \rightarrow Ti + H_2$ | 2,820 | 11,950 | 63,250 | 75,550 |
| $H_2 + Ni \rightarrow NiH_2$ | 684 | 11,054 | 92,554 | 113,024 |
| $TiH_2 + Ni \rightarrow Ti + NiH_2$ | 2,110 | 12,660 | 48,660 | 66,000 |
| $LiH + Cu \rightarrow CuH + Li$ | 1,585 | 8,950 | 30,500 | 48,550 |

The choice of the most desirable heat-dissociable material for any particular application of this invention depends partly upon the characteristics of the material in which they are carried. For example, when it is desired to utilize heats of fusion and of vaporization of the metals involved, care should be taken to choose heat dissociable material whose native metal boiling point is below the melting temperature of the carrier. Thus, if a carrier refractory such as thorium dioxide ($ThO_2$) which has a melting point of approximately 3,600°C is chosen, then titanium hydride would be very suitable for use as heat dissociable material since titanium has a boiling point of 3,535°C. Referring to Table V, it may be seen that titanium hydride is among the best materials to choose when it is desirable to utilize the heats of dissociation and of ionization of the evolved gas. However, when it is desirable to utilize heats of fusion and of vaporization of the metals but not the heats of dissociation and of ionization of the liberated gases, then the reaction of titanium hydride and nickel (boiling point is 2,730°C) would be among the best materials to use.

As indicated previously, hydrides are very useful, but are not the only materials suitable. Merely by way of example, the following table lists the characteristics of some other suitable materials. Which material is to be preferred in any particular instance depends upon the conditions of that instance. What will be best in one instance may not be best in another.

As also indicated before, alloys or mixtures of the hydride-forming metals are quite feasible. For example, alloys or mixtures of sodium and potassium (or other hydrides) with each other or with calcium, of calcium with barium or strontium, of zirconium with titanium or tantalum, of tantalum with strontium or potassium or both, of titanium and tantalum, of zirconium, titanium and tantalum, may be used in this invention, or of the hydrides of said metals. The alloys or mixtures may be of equal quantities of each metal or its hydride, or the proportions may be varied in any manner desired to achieve desired results.

TABLE VI

EXAMPLES OF OTHER HEAT-DISSOCIABLE MATERIALS BESIDES HYDRIDES AND SOME OF THEIR PROPERTIES

| Compound | Boiling Point of the Metal °C | Boiling Point of compound in °C at 1 atm | Heat of Dissociation in Cal/gm at 25°C and 1 atm | Heat of Dissociation in Cal/cc at 25°C and 1 atm | Comments |
|---|---|---|---|---|---|
| Oxides | | | | | |
| CaO | 1440 | 2850 | 2710 | 7090 | — |
| $H_2O$ | — | 100 | 3790 | 3790 | — |
| $La_2O_3$ | 4340 | 4200 | 1410 | 9170 | — |
| $Li_2O$ | 1370 | 1000 sub | 4770 | 9570 | Sublimates at 1000°C |
| MgO | 1120 | 3600 | 3570 | 12920 | — |
| NiO | 2730 | — | 724 | 5770 | Forms $Ni_2O_3$ at 400°C then $Ni_2O_3 \rightarrow$ NiO at 600°C |
| PdO | 4000 | 877d | 171.5 | 1425 | Dissociates at 877°C |
| $Ag_2O$ | 2212 | 300d | 31.3 | 223.5 | Dissociates at 300°C |
| $LiO_2$ | 3900 | 2176 M.P. | 1000 | 10900 | Melts at 2176°C |
| Fluorides | | | | | |
| $CaF_2$ | 1440 | 1330 M.P. | 3720 | 10830 | Melts at 1330°C |
| $CrF_2$ | 2500 | 1300 | 2010 | 8250 | — |
| LiF | 1370 | 1670 | 5640 | 12900 | — |
| $MgF_2$ | 1120 | 2227 | 4230 | 12700 | — |
| $MnF_2$ | 2087 | 856 M.P. | 2080 | 8090 | Melts at 856°C |
| NaF | 892 | 1704 | 3240 | 9030 | — |
| Chlorides | | | | | |
| $LaCl_3$ | 4340 | 907 M.P. | 1073 | 4230 | Melts at 907°C |
| LiCl | 1370 | 1360 | 2300 | 4770 | — |
| $LuCl_3$ | — | 892 M.P. | 810 | 3220 | Melts at 892°C |
| $NdCl_3$ | — | 784 M.P. | 1015 | 4200 | Melts at 784°C |

| | | | | | |
|---|---|---|---|---|---|
| NaCl | 892 | 1413 | 1680 | 3630 | — |
| Misc. K$_2$SO$_4$ | 770 | 1069 | 1915 | 5230 | Melts at 1069°C |
| Na$_2$CO$_3$ | 892 | 851 | 2550 | 6450 | — |
| VN | 3400 | 2050d | 631 | 3550 | Dissociates at 2050°C |

To aid in the selection of refractory and like materials for the carrier, the following table is given:

TABLE VII

EXAMPLES OF REFRACTORY CARRIER MATERIALS AND HEAT-DISSOCIABLE CARRIED MATERIALS

| Carrier Material | Point of Carrier at 1 atm | Examples of Suitable Materials to be Carried by the Carrier When Oxidation is and When the Metal is to be Vaporized | Carrier not a Problem |
|---|---|---|---|
| ThO$_2$ | 3,500°C | CaO, H$_2$O, NiO, Ag$_2$O, CaF$_2$, MgF$_2$, NaF, LiCl, NaCl, K$_2$SO$_4$, VN, LiH, KH, NiH, CuH | |
| Graphite | Sublimes at 3,652°C | H$_2$O, MgO, AgO, CrF$_2$, LiF, NaCl, VN, NaH, CaH, TiH$_{1.75}$, NiH | |
| MgO | 2800°C | H$_2$O, Li$_2$O, Ag$_2$O, CrF$_2$, MgF$_2$, NaCl KH, SrH$_2$, CuH | |

No matter which materials are chosen as the "carrier" and which as the material carried, it is essential for the embodiments wherein the material is embedded in the carrier, that the carrier be porous and that it retain its porosity or passage-works while the carried material is being vaporized. So the melting point of the carrier should be higher than the vaporization point of the carried material, for the carried material should be supported during its heat-transfer cycle in all the successive stages up to and including its vaporization.

Also it should be noted that carrier materials which do not melt but sublime at elevated temperatures, such as graphite does at ordinary pressures, have some important advantages. A carrier which sublimates in lieu of melting will retain its constituted form above its sublimation temperature even though its mass decreases by vaporization. Thus if its constituted form is porous it will retain its porous structure at elevated temperatures and vapors and gases arising from the material carried can intermix or rise to the surface of the carrier, where other processes involving the vapors and gases may take place. A material which melts directly would hinder or prevent this. The sublimation process itself is endothermic, and for graphite it has a magnitude of 140 K cal/mole and occurs at 3,500°C at a pressure of 1 atmosphere.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a space vehicle, a nose having an imperforate outer surface and incorporating adjacent said surface a heat-dissociable metallic hydride mixed directly with porous ceramic having a melting point higher than the boiling point of the metal of said hydride, said metallic hydride being chosen from the group of metals consisting of lithium, sodium, potassium, rubidium, cesium, francium, calcium, strontium, barium, radium, beryllium, magnesium, scandium, titanium, vanadium, ytterbium, zirconium, niobium, palladium, hafnium, tantalum, the rare earth metals (atomic numbers 57–71), and the actinides (atomic numbers 89–103), said hydride emitting hydrogen gas by dissociation when heated by atmospheric friction against said nose, and means to convey the emitted gas away from the nose upon dissociation of said hydride.

2. In a space vehicle, a nose having an imperforate outer surface and, adjacent said surface and generally parallel thereto, a porous carrier layer underlying said outer surface and a considerable amount of solid metallic hydride that is solid at 20°C and liberates hydrogen gas while absorbing heat at a temperature below the melting point of said carrier layer, said hydride being embedded in said carrier layer, so that heat developed at said nose surface during flight in the atmosphere is used to cause said hydride to emit hydrogen gas, thereby tending to reduce the temperature of said surface.

3. The device of claim 2 wherein said porous layer and vaporizable material are a cermet mixture of a heat-dissociable material and a porous ceramic whose melting point is high enough to sustain the porous structure until the heat-dissociable material is fully vaporized.

4. The device of claim 3 wherein the pores containing vaporizable material are interconnected.

5. In a space vehicle, a nose having an imperforate outer surface and, adjacent said surface and generally parallel thereto, a porous ThO$_2$ carrier layer underlying said outer surface and a considerable amount of solid vaporizable material that is solid at 20°C and liberates hydrogen gas while absorbing heat at a temperature below the melting point of said carrier layer, said vaporizable material being embedded in said carrier layer, said vaporizable material being chosen from the group consisting of CaO, NiO, Ag$_2$O, CaF$_2$, NaF, LiCl, NaCl K$_2$So$_4$, VN, LiH, K$_1$H, NiH, CuH, Ca, Ni, Ag, Mg, Na, Li, K, and V and mixtures with each other, so that heat developed at said nose surface during flight in the atmosphere is used to cause said vaporizable material to emit gas, thereby tending to reduce the temperature of said surface.

6. In a space vehicle, a nose having an imperforate outer surface and, adjacent said surface and generally parallel thereto, a porous carrier layer of graphite underlying said outer surface and a considerable amount of solid vaporizable material that is solid at 20°C and liberates hydrogen gas while absorbing heat at a temperature below the melting point of said carrier layer, said vaporizable material being embedded in said carrier layer, said vaporizable material being chosen from the group consisting of MgO, AgO, CrF$_2$, LiF$_2$, NaCl, VN, NaH, CaH, TiH$_{1.75}$, NiH, Mg, Ag, Cr, Li, Na, V, Ca, Ti, and Ni and mixtures with each other, so that heat developed at said nose surface during flight in the atmosphere is used to cause said vaporizable material to emit gas, thereby tending to reduce the temperature of said surface.

7. In a space vehicle, a nose having an imperforate outer surface and, adjacent said surface and generally parallel thereto, a porous carrier layer of $M_xO$ underlying said outer surface and a considerable amount of solid vaporizable material that is solid at 20°C and liberates gas while absorbing heat at a temperature below the melting point of said carrier layer, said vaporizable material being embedded in said carrier layer, said vaporizable material being chosen from the group consisting of $Li_2O$, $Ag_2O$ $CrF_2$, $MgF_2$, NaCl, KH, $SrH_2$, $CuH_2$, Li, Ag, Cr, Mg, Na, K, Sr, and Cu and mixtures with each other, so that heat developed at said nose surface during flight in the atmosphere is used to cause said vaporizable material to emit gas, thereby tending to reduce the temperature of said surface.

8. In a space vehicle, a nose having an imperforate outer layer forming the surface and a portion adjacent said surface and generally parallel thereto, said layer comprising a porous carrier containing a considerable amount of solid metallic hydride that is solid at 20°C and liberates hydrogen gas while absorbing heat at a temperature below the melting point of said carrier, said hydride being embedded in said carrier, so that heat developed at said nose surface during flight in the atmosphere is used to cause said hydride to emit hydrogen gas, thereby tending to reduce the temperature of said surface.

* * * * *